(12) United States Patent
Minemoto et al.

(10) Patent No.: US 8,360,135 B2
(45) Date of Patent: Jan. 29, 2013

(54) MOLD COOLING DEVICE

(75) Inventors: Masayuki Minemoto, Osaka (JP); Yoshitaka Sueki, Osaka (JP)

(73) Assignee: J. F. T. Co., Ltd., Osaka (JP)

( * ) Notice: Subject to any disclaimer, the term of this patent is extended or adjusted under 35 U.S.C. 154(b) by 794 days.

(21) Appl. No.: 11/885,398

(22) PCT Filed: Mar. 1, 2006

(86) PCT No.: PCT/JP2006/303850
§ 371 (c)(1), (2), (4) Date: Dec. 17, 2008

(87) PCT Pub. No.: WO2006/098152
PCT Pub. Date: Sep. 21, 2006

(65) Prior Publication Data
US 2009/0236493 A1      Sep. 24, 2009

(30) Foreign Application Priority Data
Mar. 15, 2005   (JP) .................................. 2005-072992

(51) Int. Cl.
B22D 27/04        (2006.01)

(52) U.S. Cl. ........................................ 164/128; 164/348

(58) Field of Classification Search .................. 164/128, 164/297, 348, 443
See application file for complete search history.

(56) References Cited

U.S. PATENT DOCUMENTS

| | | | | |
|---|---|---|---|---|
| 3,880,227 A | * | 4/1975 | Bauer | ............................. 165/61 |
| 6,126,388 A | * | 10/2000 | Yamanaka et al. | ............. 415/111 |
| 2003/0085491 A1 | | 5/2003 | Saeki et al. | |

FOREIGN PATENT DOCUMENTS

| | | |
|---|---|---|
| JP | 62-158533 | 7/1987 |
| JP | 08-243713 | 9/1996 |
| JP | 09-085420 | 3/1997 |
| JP | 09-253825 | 9/1997 |
| JP | 10-080758 | 3/1998 |
| JP | 11-170024 | 6/1999 |

OTHER PUBLICATIONS

Supplementary European Search Report dated Dec. 4, 2008 for European Application No. 06714968.2.

* cited by examiner

Primary Examiner — Kuang Lin
(74) Attorney, Agent, or Firm — Wenderoth, Lind & Ponack, L.L.P.

(57) ABSTRACT

At the operation of a suction pump, a negative pressure is generated in a supply-side pipe line, a cooling passageway of a mold, and a return-side pipe line. Cooling water stored in a water tank is sucked by the negative pressure, flows from a first feed-water inlet to the supply-side pipe line, flows through the supply-side pipe line, and enters the cooling passageway of the mold. After the cooling water cools down the mold while flowing through the cooling passageway of the mold, it flows out to the return-side pipe line. Additionally, at the operation of the suction pump, a negative pressure is also generated in a bypass pipe line. The cooling water stored in the water tank is sucked by the negative pressure, flows from a second feed-water port to the bypass pipe line, and enters the return-side pipe line via the bypass pipe line.

5 Claims, 4 Drawing Sheets

MOLD COOLING DEVICE

FIELD OF THE INVENTION

The present invention relates to a mold cooling device for cooling a mold by supplying a cooling passageway formed in the mold with cooling water, in die casting, resin molding or the like.

BACKGROUND OF THE INVENTION

For example, in the casting process, such as die casting, low pressure casting, and gravity casting, the forced cooling of a mold is conducted for the purpose of the stabilization of quality caused by the reductions in cycle time of the casting and the control of solidification of the molten metal injected into the mold cavity. Such forced cooling of a mold is generally conducted by pumping the cooling water, pressurized by a pressure pump, into the cooling passageway of the mold (e.g., Patent Document 1).

However, in the manner where the cooling water is pumped into the cooling passageway of the mold, a pressure loss occurs or a state of turbulence occurs when the cooling water flows through the piping system or the cooling passageway of the mold, which may cause the cooling water to be non-uniformly distributed to the whole flow passageway. Due to this, water deposit or cake is deposited at the locations where the cooling water is unlikely to flow, which may prevent the cooling water from being sufficiently supplied to the cooling passageway of the mold. Moreover, in the case where the mold is cracked due to thermal fatigue caused by long-term usage or the like, it is a concern that the cooling water may leak to the outside of the mold or into the cavity via the crack.

In order to avoid the aforementioned disadvantage, the means of forced cooling of the mold can be a suction pump connected to the outlet side of the cooling passageway of the mold whereby the cooling water is sucked by the suction force of the suction pump, so that the cooling water flows through the cooling passageway of the mold (e.g., Patent Documents 2 to 5).

[Patent Document 1] Japanese Patent Unexamined Publication No. 10-80758
[Patent Document 2] Japanese Patent Unexamined Publication No. 9-85420
[Patent Document 3] Japanese Patent Unexamined Publication No. 8-243713
[Patent Document 4] Japanese Patent Unexamined Publication No. 9-253825
[Patent Document 5] Japanese Patent Unexamined Publication No. 11-170024

SUMMARY OF THE INVENTION

The cooling water flowing through the cooling passageway of the mold may be vaporized under heat of the molten metal injected into the mold cavity and be turned into water vapor. In particular, the protruded portion within the mold cavity, such as a core pin, is likely to receive much heat from the molten metal, and is likely to increase in temperature more than the other portions. Therefore, the cooling water is likely to be vaporized in the cooling passageway provided within the protruded portion such as the core pin, and, in particular, is likely to be vaporized at the initial stage of the cooling at which the temperature of the mold is high. Water vapor generated in the cooling passageway of the mold is less likely to be uniformly distributed into the cooling water as fine air bubbles, and is separated from the cooling water in the form of agglomeration of water vapor with a relatively large volume.

The agglomeration of water vapor generated in the cooling passageway of the mold flows from the outlet of the cooling passageway to a discharge-side piping by the suction force of the suction pump. However, since the agglomeration of water vapor is present within the discharge-side piping, the cooling water closer to the cooling passageway than the agglomeration of water vapor becomes less likely to flow under vapor pressure of the agglomeration of water vapor. As a result, the amount of cooling water flowing through the cooling passageway may become insufficient and the cooling efficiency may decrease. In addition, since the agglomeration of water vapor with high temperature is sucked by the suction pump, the burden on the suction pump increases and the durability of the suction pump is disadvantageously affected. Specifically, at the initial stage of the cooling, a large amount of generated water vapor with high temperature brings the rapid volume expansion and the increase in pressure within the discharge-side piping. When the water vapor is sucked into the usually used suction pump, the suction pump is deteriorated due to high temperature and the suction becomes insufficient due to the pressure of the water vapor, thereby leading to the further decrease in cooling efficiency.

An object of the present invention is to solve the aforementioned problem due to the agglomeration of water vapor within the discharge-side piping, and to achieve the increase in the cooling efficiency and the increase in the durability of the suction pump.

In order to solve the aforementioned problem, the present invention provides a mold cooling device for cooling the mold by allowing cooling water to flow through a cooling passageway formed in the mold, the device including: a water tank storing the cooling water; a supply-side pipe line leading from the water tank to the inlet of the water passageway of the mold; a return-side pipe line leading from the outlet of the cooling passageway of the mold to the water tank; a suction pump disposed in the return-side pipe line; and a bypass pipe line which is connected to the suction pump or is branch-connected to the return-side pipe line at the location upstream of the suction pump, the suction pump including: a suction chamber generating a negative pressure by the rotation of a gear; and a swirling chamber generating a swirling flow of the cooling water which is discharged from the suction chamber, wherein the cooling water within the water tank is sucked by the negative pressure generated at the operation of the suction pump so that the cooling water flows from the supply-side pipe line to the return-side pipe line via the cooling passageway of the mold, and the cooling water is supplied to the suction pump via the bypass pipe line.

In the above structure, after an air supplying pipe is branch-connected to the supply-side pipe line and the cooling of the mold by the cooling water is completed, the supply-side pipe line may be closed at the upstream of the air supplying pipe, so that the pressurized air is supplied from the air supplying pipe to the supply-side pipe line.

Alternatively, in the above structure, after the air supplying pipe is branch-connected to the supply-side pipe line and the cooling of the mold by the cooling water is completed, the supply-side pipe line may be closed at the upstream of the air supplying pipe and the air supplying pipe may be opened to the external air, so that the external air is introduced from the air supplying pipe into the supply-side pipe line by the operation of the suction pump.

According to the present invention, the sufficient amount of cooling water can flow to the cooling passageway of the mold to increase the cooling efficiency. In addition, the decrease in durability of the suction pump due to the suction of water vapor can be prevented.

Figure 1:
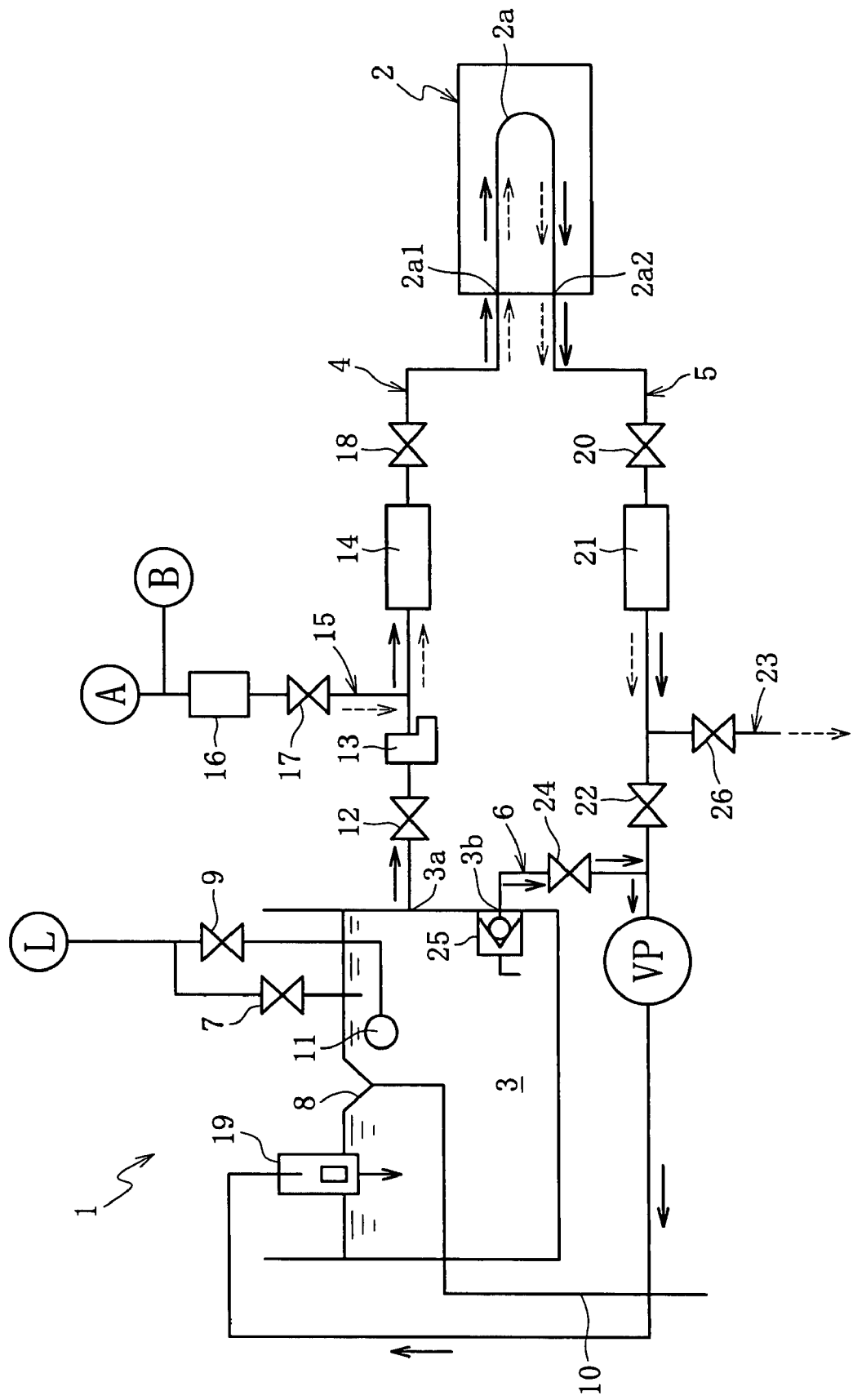
FIG. 1 is a piping diagram showing the entire configuration of a mold cooling device according to an embodiment.

EXPLANATION OF REFERENCES 1 mold cooling device
2 mold
2a cooling passageway
2a1 inlet
2a2 outlet
3 water tank
4 supply-side pipe line
5 return-side pipe line
6 bypass pipe line
15 air supplying pipe
VP suction pump
31 suction chamber
31a gear
32 swirling chamber

DETAILED DESCRIPTION OF THE INVENTION

Hereinafter, embodiments of the present invention will be described.

FIG. 1 shows a mold cooling device 1 according to an embodiment. The mold cooling device 1 conducts forced cooling in a mold 2 in a casting process such as die casting or the like. The mold cooling device 1 includes: a water tank 3 storing cooling water; a supply-side pipe line 4 leading from a first feed-water inlet 3a of the water tank 3 to an inlet 2a1 of a cooling passageway 2a of the mold 2; a return-side pipe line 5 leading from an outlet 2a2 of the cooling passageway 2a of the mold 2 to the water tank 3; a suction pump VP disposed in the return-side pipe line 5; and a bypass pipe line 6 leading from a second feed-water inlet 3b of the water tank 3 to the return-side pipe line 5 (the upstream location of the suction pump VP).

The cooling water is supplied to the water tank 3 via a feed-water valve 7 from a water source L such as water line. The feed-water valve 7 is closed at the time when the predetermined amount of cooling water is stored in the water tank 3, and the amount of the cooling water stored in the water tank 3 is maintained to be the predetermined amount by an overflow valve 8 and an automatic feed valve 9. Specifically, when the cooling water in the water tank 3 exceeds the defined amount, the amount exceeding the defined amount flows into the overflow valve 8 and is discharged to the outside of the water tank 3 via a discharging pipe 10. When the cooling water in the water tank 3 becomes less than the defined amount, the decrease in the amount is detected by detecting means 11 and the automatic feed valve 9 is opened to automatically supply the cooling water to the water tank 3.

The first feed-water inlet 3a of the water tank 3 is connected to the inlet 2a1 of the cooling passageway 2a of the mold 2 via the supply-side pipe line 4. An opening/closing valve 12, a strainer 13, a manifold 14, an opening/closing valve 18 are disposed in the supply-side pipe line 4, sequentially from the upstream (the side of the water tank 3). An air supplying pipe 15 is branch-connected between the strainer 13 and the manifold 14. The air supplying pipe 15 is connected to a pressurized-air source A, and the pressurized air is supplied from the pressurized-air source A to the supply-side pipe line 4 via an air filter 16 and an opening/closing valve 17.

One end of the return-side pipe line 5 is connected to the outlet 2a2 of the cooling passageway 2a of the mold 2, and the other end thereof is connected to a water-air separator 19. Moreover, an opening/closing valve 20, a manifold 21, an opening/closing valve 22, and a suction pump VP are disposed in the return-side pipe line 5, sequentially from the upstream (the side of the mold 2). The bypass pipe line 6 is branch-connected at the location upstream the suction pump VP, specifically between the suction pump VP and the opening/closing valve 22, and an air discharging pipe 23 is branch-connected between the opening/closing valve 22 and the manifold 21. An opening/closing valve (or a flow adjusting valve) 24 is disposed in the bypass pipe line 6. Moreover, a check valve 25 is attached to the second feed-water inlet 3b of the water tank 3 in order to prevent the cooling water from flowing from the bypass circuit 6 into the water tank 3. The air discharging pipe 23 can be opened/closed by the operation of the opening/closing valve 26.

Figure 3A:
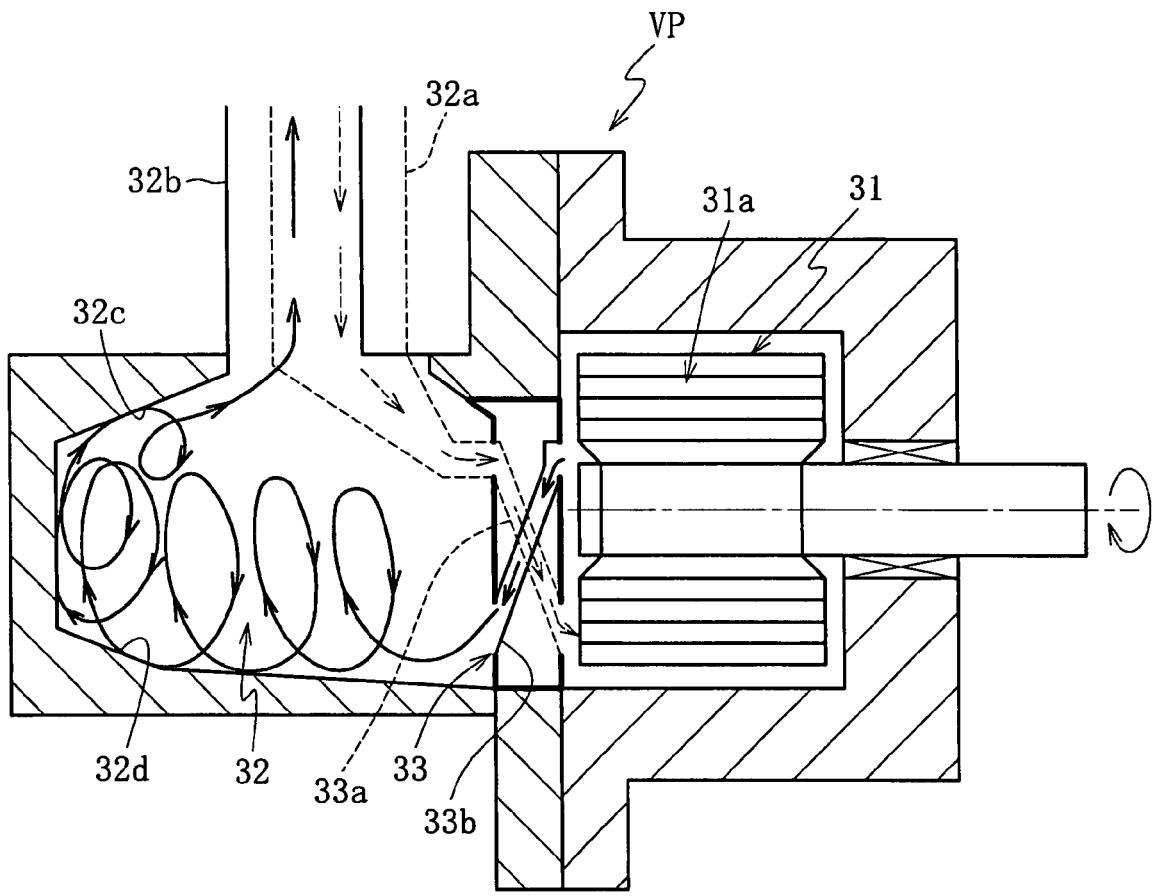
FIGS. 3(a) and 3(b) are diagrams schematically showing the structure of a suction pump.
Figure 3B:
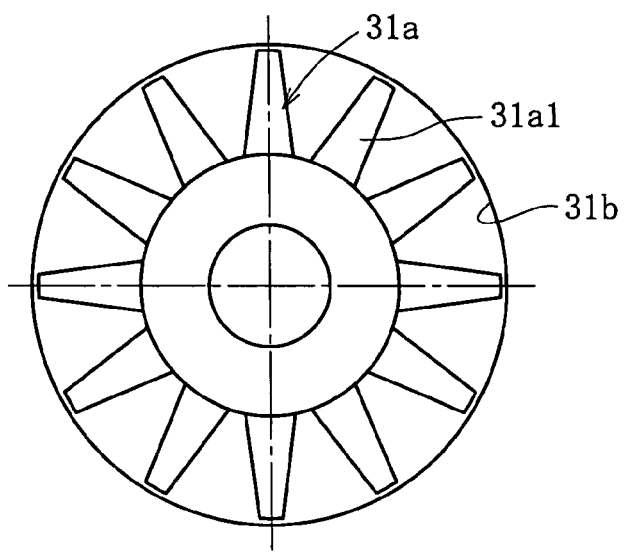

As schematically shown in FIGS. 3(a) and 3(b), the suction pump VP includes a suction chamber 31 inside of which a gear 31a is arranged, a swirling chamber 32 generating a swirling flow of the fluid discharged from the suction chamber 31, a swirling plate 33 placed at the boundary portion between the suction chamber 31 and the swirling chamber 32. Moreover, a suction port 32a and a discharge port 32b are placed over the swirling chamber 32. In FIG. 3, the discharge port 32b is set in front of the paper, and the suction port 32a is set at the back of the paper and is being denoted by dashed lines. Each one end of the suction port 32a and the discharge port 32b is connected to the return-side pipe line 5. The other end of the suction port 32a passes through the swirling chamber 32 and is connected to the swirling plate 33. The other end of the discharge port 32b is communicated with the swirling chamber 32.

The gear 31a includes a plurality of teeth 31a1, and each tooth 31a1 is suited to the inner wall of the suction chamber 31 with a small gap interposed therebetween. When the gear 31a rotates, a negative pressure generates in the suction chamber 31. By this negative pressure, the fluid (liquid, gas or gas-liquid mixing fluid) is sucked from the suction port 32a into the suction pump VP.

The cooling water sucked from the suction port 32a enters the swirling plate 33 placed at the boundary portion between the swirling chamber 32 and the suction chamber 31, and is sucked into the suction chamber 31 via a swirling passage 33a in the swirling plate 33. Then, the cooling water to which high energy is applied by the rotation of the gear 31a provided in the suction chamber 31 once again flows into the swirling chamber 32, which is designed to have space volume greater than the suction chamber 31, at high speed while swirling, via a swirling passage 33b in the swirling plate 33 (the swirling passage 33a and the swirling passage 33b are independent passages from each other). The cooling water flowing into the swirling chamber 32 is merged at portion of the discharge port 32b while hitting the internal inclined walls 32c, 32d of the swirling chamber 32 and other wall surfaces and swirling, so that the cooling water have greater energy and is discharged through the discharge port 32b.

Figure 2:
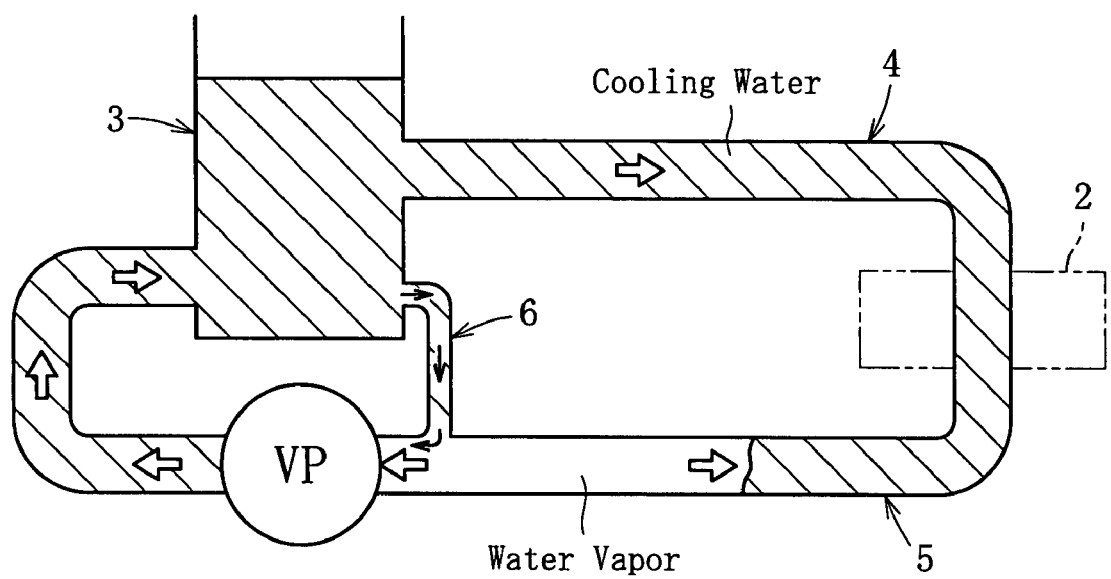
FIG. 2 is a diagram schematically showing the flow system of cooling water.

For example, at the initial stage of the cooling, only the great amount of water vapor is often discharged from the cooling passageway 2a of the mold 2 to the return-side pipe line 5 to generate the agglomeration of water vapor, as schematically shown in FIG. 2. This water vapor is sucked by the suction pump VP. On the other hand, since the cooling water is always supplied from the water tank 3 to the suction pump VP via the bypass pipe line 6, the water vapor sucked by the suction pump VP is cooled down and contracted by the swirling flow of the cooling water swirling within the swirling chamber 32 at high speed. Therefore, the cooling water can smoothly flow without the water vapor retention within the return-side pipe line 5 and the suction pump VP. In addition, the inside of the suction pump VP, in particular the bearing portion, the sealing portion or the like of the gear 31a is cooled down by the cooling water supplied to the suction pump VP via the bypass pipe line 6, and thereby the durability of the suction pump VP is increased.

Now, when the line resistances (including pressure drop) of a series of pipe lines consisting of the supply-side pipe line 4, the cooling passageway 2a, and the return-side pipe line 5 (the portion leading to the suction pump VP) is greater than the line resistances (including pressure drop) of the pipe line leading from the water tank 3 to the suction pump VP via the bypass pipe line 6, the phenomenon in which the cooling water does not flow through the series of pipe lines but flows into the suction pump VP only via the bypass pipe line 6 may occur (the phenomenon of short circuit of the cooling-water passageway in the bypass pipe line 6). Therefore, the flow rate of the cooling water flowing through the bypass pipe line 6 is throttled by reducing the pipe diameter of the bypass pipe line 6 to be smaller than the pipe diameter of the return-side pipe line 5 or the like and/or adjusting the flow rate by the a flow-rate adjusting valve or the like. Thereby, both line resistances are made equal and the cooling water is sucked from both passageways to the suction pump VP. As a result, the amount of the cooling water flowing into the suction pump VP via the bypass pipe line 6 becomes relatively less. However, as described above, since the suction pump VP in this embodiment has the structure in which the high-speed swirling flow is generated within the swirling chamber 32, the sucked water vapor can be sufficiently cooled and contracted by a small amount of cooling down water supplied via the bypass pipe line 6.

When the cooling of the mold 2 is progressed and the water vapor is not generated within the cooling passageway 2a of the mold 2, only the cooling water flows to the supply-side pipe line 4, the cooling passageway 2a, and the return-side pipe line 5. In order to keep flowing a predetermined amount of cooling water while overcoming the pressure drop of this long series of pipe lines, the suction pump VP must have a relatively high pumping ability. The suction pump VP in this embodiment is configured to apply high energy to the cooling water by the rotation of the gear 31a in the suction chamber 31 and further produce the high-speed swirling flow by swirling this cooling water in the swirling chamber 32 to apply additional energy to the cooling water. Therefore, the suction pump VP in the embodiment can realize the pumping ability higher than the usually used suction pump. For example, the usually used suction pump has generally the ability of the degree of vacuum of 45 KPa and the flow rate of 100 L/min or less, while the suction pump VP of the embodiment has the pumping ability of the degree of vacuum of 90 KPa and the flow rate of 150 L/min or more.

The air separator 19 does not need to be of any particular type if it can separate and remove the air mixed into the cooling water, but the known cyclone or centrifugal gas-liquid separator or the like can be utilized.

When the pouring into the mold 2 is started (the start of injection), an injection starting signal is output from a molding machine to a control unit of the mold cooling device 1. When the injection starting signal is input to the control unit of the mold cooling device 1, a cooling delay timer provided in the control unit operates. After a predetermined time set by the cooling delay timer has passed, the opening/closing valve 12 and opening/closing valve 22 are opened (the opening/closing valve 17 and the opening/closing valve 26 are being closed) and simultaneously operate the suction pump VP, and the cooling water is started to be supplied to the mold 2. Note that the opening/closing valve 24 of the bypass pipe line 6 is always being opened.

When the suction pump VP operates, a negative pressure is generated in the supply-side pipe line 4, the cooling passageway 2a of the mold 2, and the return-side pipe line 5 (the location upstream of the suction pump VP). The cooling water stored in the water tank 3 is sucked by this negative pressure to flow from the supply-side pipe line 4 to the first feed-water inlet 3a, flow through the supply-side pipe line 4, and enter the cooling passage 2a of the mold 2. The cooling water deprives the amount of heat from the mold 2 while flowing through the cooling passageway 2a of the mold 2 and thereby cools down the mold 2, and then flows out to the return-side pipe line 5. On the other hand, the negative pressure is generated within the bypass pipe line 6 by the operation of the suction pump VP. The cooling water stored in the water tank 3 is sucked by this negative pressure to flow out from the second feed-water inlet 3b to the bypass pipe line 6 and enter the return-side pipe line 5 via the bypass pipe line 6. Therefore, the cooling water flowing from the cooling passageway 2a of the mold 2 and the cooling water flowing into from the bypass pipe line 6 are merged on the side downstream of the branching connection portion of the bypass pipe line 6, and the merged cooling water is sucked by the suction pump VP. The cooling water sucked by the suction pump VP flows into the water-air separator 19 through the return-side pipe line 5, and the gas component incorporated into the cooling water (air bubbles or water vapor bubbles) is separated and removed by the water-air separator 19 and the cooling water is returned to the water tank 3. In FIG. 1, such flow of the cooling water is denoted by the sold arrows.

The cooling time of the mold 2 by the flow of the cooling water is counted by a cooling-water timer provided in the control unit of the mold cooling device 1. After the predetermined time set by the cooling-water timer has passed, the opening/closing valves 12 and 22 are closed and the opening/closing valves 17 and 26 are opened. Thereby, the pressurized air is supplied from the pressurized-air source A to the supply-side pipe line 4 via the air supplying pipe 15, and is discharged outside via the cooling passageway 2a of the mold 2, the return-side pipe line 5, and the air discharging pipe 23. The flow of the pressurized air allows the cooling water remaining within the supply-side pipe line 4, the cooling passageway 2a of the mold 2 and the return-side pipe line 5 to be purged and the negative pressure in the pipe line to be removed. An air-purging time by the flow of the pressurized air is counted by an air-purging timer provided in the control unit of the mold cooling device 1. After the predetermined time set by the air-purging timer has passed, the opening/closing valves 17 and 26 are closed so that the pressurized air is stopped being supplied. In FIG. 1, such flow of the pressurized air is denoted by the dashed arrows.

The mold cooling device 1 repeats the above cycle operation in accordance with a signal output from a molding machine. When a waiting time from the end of one cycle operation to the start of the next cycle operation is less than the predetermined time, the suction pump VP maintains the operation state. On the other hand, the waiting time is more than the predetermined time, the suction pump VP is stopped by the control unit of the mold cooling device 1. The waiting time is managed by a pump stopping timer provided in the control unit of the mold cooling device 1.

In some cases, the air purging by the flow of the pressurized air may not completely remove the water vapor remaining in the pipe lines, the contaminations, such as water deposit and debris, attached to the pipe walls. In this case, the water vapor and the attaching contaminations can be removed by taking advantage of the suction pump VP capable of also sucking gases for continuing the suction by the suction pump VP. Specifically, the pressurized-air source A stops supplying the pressurized air, and an external air inlet B is opened so that the air supplying pipe 15 is opened to the external air (at this time, the opening/closing valve 26 is closed). In this manner, the external air is introduced into the pipe line from the external air inlet B via the air supplying pipe 15 by the sucking force of the suction pump VP, and this flow of the external air allows the water vapor and the attaching contaminations to be removed. At this time, when the cooling water is supplied to the suction pump VP via the bypass pipe line 6, the rise of temperature of the inside of the suction pump VP, in particular the bearing portion or the sealing portion of the gear 31*a*, due to the suction of only the air, can be suppressed.

Figure 4:
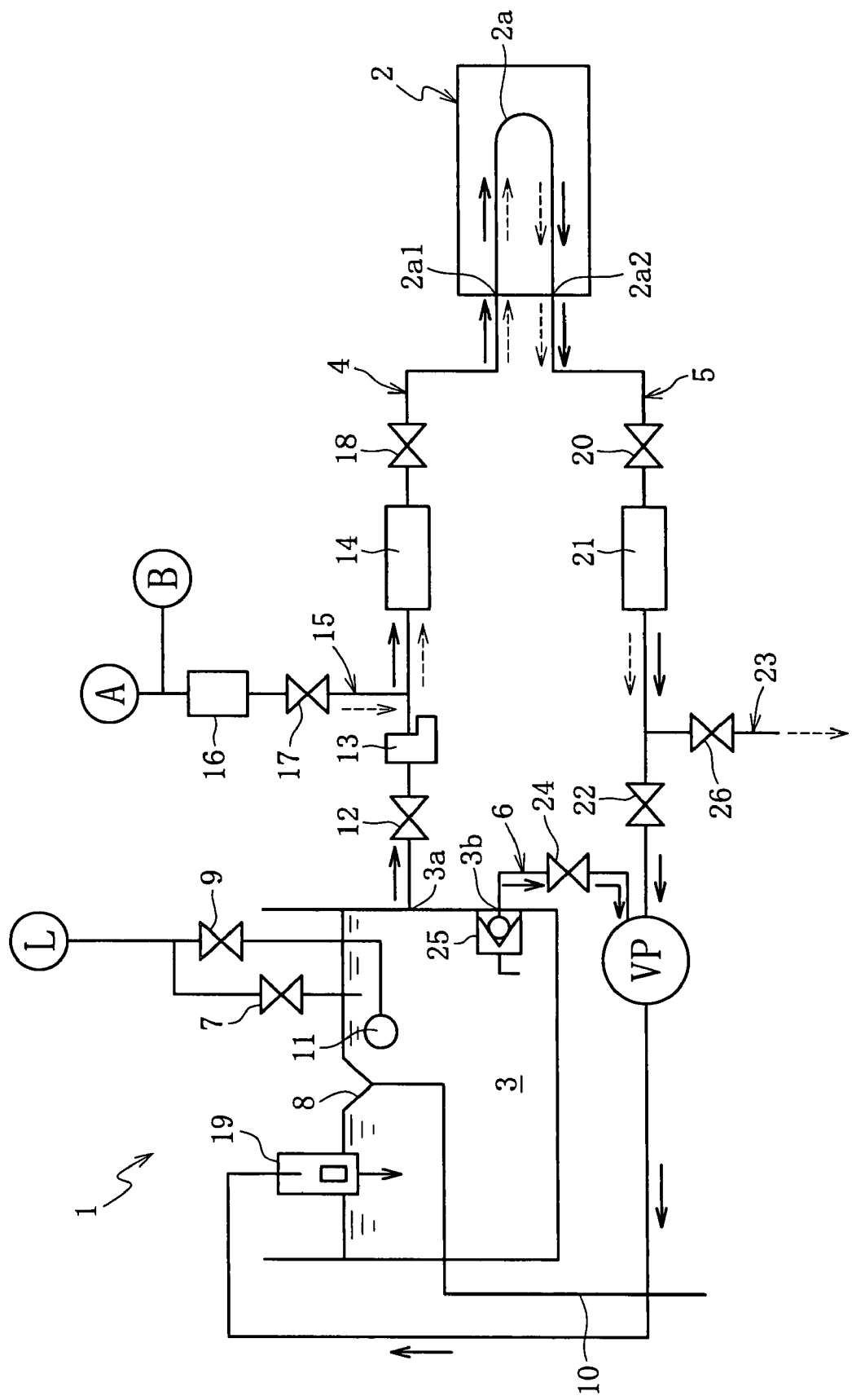
FIG. 4 is a piping diagram showing the entire configuration of a mold cooling device according to another embodiment.

FIG. 4 shows an embodiment in which the bypass pipe line 6 is directly connected to the suction pump VP. In this case, the suction port 32*a* of the suction pump VP is branched to be forked, and the branched ports are connected to the return-side pipe line 5 and the bypass pipe line 6, respectively. The other matters are the same in the aforementioned embodiment, and thus the descriptions will not be repeated.

Although FIGS. 1 and 4 show the structure for cooling the single mold 2, a plurality of molds 2 can be connected to the manifolds 14 and 21 so that the forced cooling is conducted by supplying the plurality of molds 2 with the cooling water (and the pressurized air). Moreover, the cooling device of the present invention can be utilized for cooling a resin molding mold.

What is claimed is:

1. A method of operating a mold cooling device for cooling a mold by causing cooling water to flow through a cooling passageway provided in the mold, the mold cooling device including:
    a water tank for storing the cooling water;
    a supply-side pipe line connecting the water tank to an inlet of the cooling passageway of the mold;
    a return-side pipe line connecting an outlet of the cooling passageway of the mold to the water tank;
    a suction pump disposed in the return-side pipe line; and
    a bypass pipe line having a first end connected to the suction pump or connected to and branched from the return-side pipe line at a location upstream of the suction pump, and a second end connected to the water tank, wherein
    the suction pump includes a suction chamber in which a negative pressure is generated by gear rotation, and a swirling chamber that generates a swirling flow of the cooling water discharged from the suction chamber,
    the method comprising:
    sucking the cooling water in the water tank by the negative pressure generated by the suction pump, thereby causing the cooling water to flow from the supply-side pipe line to the return-side pipe line via the cooling passageway of the mold, and concurrently causing the cooling water to flow to the suction pump via the bypass pipe line.

2. The method of claim 1, wherein the mold cooling device further includes:
    an air supplying pipe connected to and branching from the supply-side pipe line; and
    a valve disposed in the supply-side pipe line and located upstream of the air supplying pipe,
    the method further comprising:
    after the cooling of the mold by the cooling water is completed, closing the valve disposed in the supply-side pipe line; and
    supplying pressurized air from the air supplying pipe to the supply-side pipe line.

3. The method of claim 1, wherein the mold cooling device further includes:
    an air supplying pipe connected to and branching from the supply-side pipe line; and
    a valve disposed in the supply-side pipe line and located upstream of the air supplying pipe,
    the method further comprising:
    after the cooling of the mold by the cooling water is completed, closing the valve disposed in the supply-side pipe line; and
    introducing external air from the air supplying pipe to the supply-side pipe line by the negative pressure generated by the suction pump.

4. The method of claim 1, wherein
    the suction pump has a swirling plate separating the suction chamber from the swirling chamber, and
    the swirling plate has an input swirling passage and an output swirling passage.

5. The method of claim 4, wherein
    the suction pump has a suction port connected to an upstream side of the return-side pipe line and a discharge port connected to a downstream side of the return-side pipe line,
    the suction port passes through the swirling chamber and connects to the input swirling passage of the swirling plate, and
    the output swirling passage connects the suction chamber to the swirling chamber for the discharge of the cooling water from the suction chamber to the swirling chamber.

* * * * *